(No Model.)

S. A. NOLEN.
HARNESS SADDLE.

No. 489,087. Patented Jan. 3, 1893.

Witnesses:
A. B. Diggle
R. H. Hopper

Inventor
Stephen A. Nolen
by E. E. Masson
atty.

UNITED STATES PATENT OFFICE.

STEPHEN A. NOLEN, OF McCRORY, ARKANSAS.

HARNESS-SADDLE.

SPECIFICATION forming part of Letters Patent No. 489,087, dated January 3, 1893.

Application filed September 1, 1892. Serial No. 444,794. (No model.)

*To all whom it may concern:*

Be it known that I, STEPHEN A. NOLEN, a citizen of the United States, residing at Mc-Crory, in the county of Woodruff and State of Arkansas, have invented certain new and useful Improvements in Harness-Saddles, of which the following is a specification, reference being had therein to the accompanying drawings.

My invention relates to harness saddles that are constructed to relieve the animal carrying it of the violent jolts and jars to which he is generally subjected when harnessed to a cart and made to travel over rough roads and streets; and the objects of my improvement are to provide a harness saddle with narrow leaf-springs oscillatingly retained upon the top of the saddle, or upon the arched link thereof that unites the back-pads together. I attain these objects by the construction illustrated in the accompanying drawings in which:—

Figure 1:
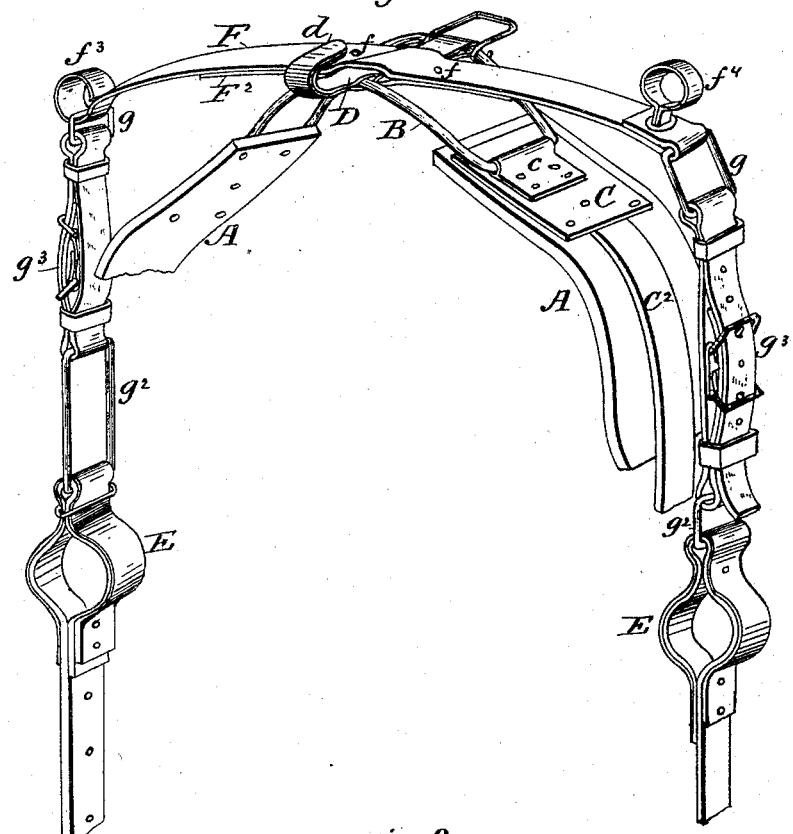
Figure 2:
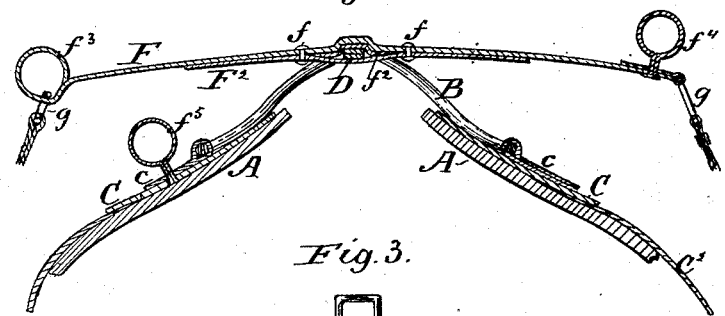
Figure 3:
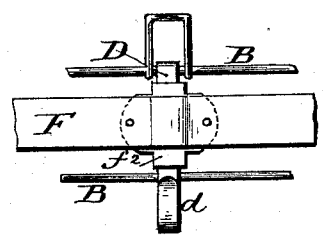

Figure 1 is a perspective view of a gig-tree or harness-saddle constructed in accordance with my invention. Fig. 2 is a central vertical view of the same. Fig. 3 is a top view of the central portion of the saddle.

In said drawings A represents the pads or aprons of the saddle that are united together by means of an arched-up link B. Said link is made of a suitably bent rod or heavy wire, and has its ends hinged to the pads by means of sheet metal straps $c$ that rest upon and are secured to larger sheet metal plates C. Said plates and straps are attached to the pads A by means of clinched nails or rivets. The strap $C^2$ forming a portion of the belly-band has its upper end secured to the saddle between the top of the pad A and the plate C. The front and back portions of the link B are united together at the top of the arch by means of a bar D that is preferably folded in the middle of its length where it embraces the back part of the link, the two ends of said bar being bent up to form a hook $d$ generally used to receive the check rein of a bridle.

To provide the shaft-tugs E, with a spring support, to relieve the back of the animal of the jolts and jars produced by the sudden vertical oscillations of the shafts of the carts and other vehicles, a springy flat bar F, of steel or other springy metal, has its middle portion resting upon the top of the bar D said middle portion being slightly arched up to form a seat for said bar D. To retain the bar F in proper position upon the bar D and also strengthen the central portion of said bar F, a bar $F^2$ is made to pass under the bar F and is secured to the spring-bar F substantially parallel therewith by means of bolts or rivets $f$. To retain the bar F equidistant from the front and back portions of the link B, a small plate $f^2$ wider than the bar F is placed under the central portion of said bar F and secured thereto also by the rivets $f$. There is preferably a slight amount of play between the sides of the bar D and the springy bars to permit the two ends of the latter to uniformly support the two shafts of a cart even if the horse is traveling upon a road having one side on a higher level than the other side.

Various means may be used to connect the shaft-tugs with the springy-bar F, for example, the ends of said bars may be coiled up and formed into an annular loop $f^3$ as shown on the left hand side of Figs. 1 and 2, and be used as a terret or line carrier, as well as a support for the links $g$ and $g^2$ and the adjustable leather strap $g^3$ that unite it to the shaft-tug. Each end of the spring-bar F may also be folded upon itself as shown on the right hand side of Figs. 1 and 2 and a suitable terret $f^4$ be secured thereto. By this construction the lines will be carried far apart and high above the back of the animal and not so liable to become caught under the animal's tail. But the saddle can be also provided with terrets $f^5$ located thereon in the usual position above the pads thereof.

Having now fully described my invention, I claim:—

1. In combination with the arched metallic link uniting the pads of a saddle, and a check-hook bar D uniting the front portion of the link to the back portion thereof, a spring supporting-bar balanced upon said bar D and carrying the shaft-tugs substantially as described.

2. A harness saddle comprising the pads connected by a link B, a check-hook bar connecting the two members of the link B, and a spring supporting bar for the shaft-tugs, and having the bar F² secured thereto and attached to the check hook bar, substantially as described.

3. A harness-saddle comprising the pads connected by an arched link B, a check-hook connecting the two members of the link B, and a spring supporting bar for the shaft-tugs and having terrets on the ends thereof substantially as described.

4. In combination with arched metallic link uniting the pads of a saddle and a bar D uniting the front portion of the link to the back portion thereof, a shaft-tug springy supporting-bar F secured upon the bar D, the plate f² and the bar F² thereunder substantially as described.

In testimony whereof I affix my signature in presence of two witnesses.

STEPHEN A. NOLEN.

Witnesses:
R. L. LOWRIE,
T. S. NEAL.